April 11, 1961
W. HEIMANN
2,979,621
IMAGE CONVERTER
Filed Nov. 18, 1957
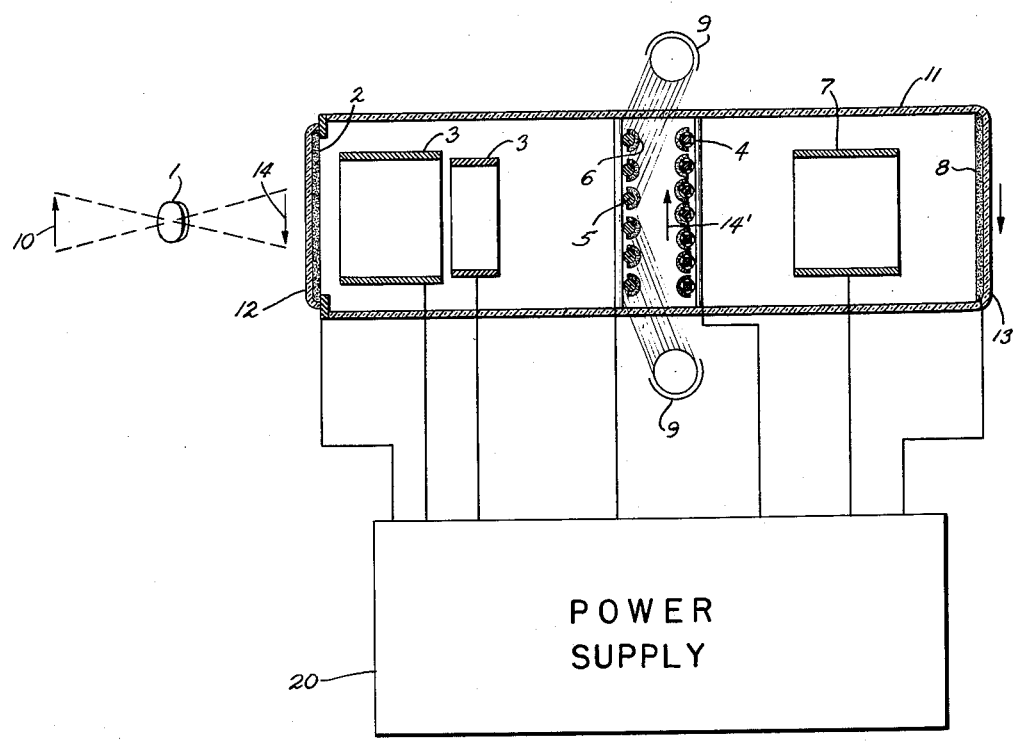
INVENTOR
WALTER HEIMANN
BY
Murray J. Ellman
ATTORNEY United States Patent Office 2,979,621
Patented Apr. 11, 1961

2,979,621

IMAGE CONVERTER

Walter Heimann, Am Kohlheck, Wiesbaden-Dotzheim, Germany, assignor to Physikalisch-Technische Werkstatten, Wiesbaden-Dotzheim, Germany, a corporation of Germany Filed Nov. 18, 1957, Ser. No. 697,104

Claims priority, application Germany Nov. 17, 1956

8 Claims. (Cl. 250—213)

The present invention relates to an image converter. More particularly, the present invention relates to an apparatus for producing an image of an object having a higher illumination than the illumination of the original object.

Conventional image converter tubes in use today incorporate apparatus for producing an image of an object on a photo-responsive surface. The image formed on the photo-responsive surface produces corresponding intensity electrons which are directly focused on a light screen. In this manner, it is possible to convert an object illuminated solely by infrared rays to an image visible to the naked eye. For this purpose, the photo-responsive surface emits electrons responsive to infrared rays impinging thereon.

In television camera tubes, signal plates are used instead of light screens, such as in the super iconoscope tube. The signal plate is able to store the image produced thereon until the same is removed by a separate electron beam. However, the moment that the electron beam impinges on the stored image, the potential distribution along the signal plate is distorted. It is, therefore, impossible by such methods to produce a high intensity clear image from an image stored on a signal plate.

Similarly, some objects are illuminated only by very short light pulses. In order to create a visible image of such an object, it is necessary to use phosphors having a long persistence characteristic. This is disadvantageous and only provides a compromise solution in the case wherein the object is moving. In addition, in conventional image converter tubes, it is not possible to store a picture whenever desired.

The present invention overcomes the disadvantages of conventional image converter tubes and light amplifiers by providing means for amplifying the effect of the image formed on the photo-responsive surface.

It is, accordingly, an object of the present invention to overcome the disadvantages of prior art devices as discussed above.

A second object of the present invention is to provide a new and improved image converter apparatus.

Another object of the present invention is to provide a new and improved image converter apparatus having light amplification characteristics.

A further object of the present invention is to provide an apparatus for producing a high intensity image from a low intensity object.

With the above objects in view, the present invention mainly consists of apparatus for producing an image of an object including a first member spaced from the object and having a surface responsive to light rays emitted from the object. This surface produces charged particles which are related to the intensity of the light rays impinging thereon. An image forming member spaced from the first member and having an image forming surface responsive to any charged particles impinging thereon is also provided. This apparatus also includes a second source of charged particles spaced from the image forming surface, accelerating means arranged between the second source of charged particles and the image forming surface for producing a flow of charged particles along a path between the second source and the image forming surface, a grid member arranged in the path between the second source of charged particles and the accelerating means for controlling the flow of charged particles between the second source and the image forming surface in accordance with the potential distribution along the grid member and means for focusing on the grid member the charged particles emitted from the light responsive surface of the first member to produce thereby a potential distribution pattern along the grid member corresponding to any pattern formed by the light rays impinging on the light responsive surface. Accordingly, the potential distribution pattern formed along the grid member produces a corresponding pattern on the image forming surface.

In a preferred embodiment of the apparatus, the responsive surface on the first member is responsive to infrared rays and emits electrons proportional to the intensity of the infrared rays impinging thereon.

In another preferred embodiment of the present invention, the apparatus is arranged in a fluid-tight envelope having translucent end walls, with the responsive surface of the first member arranged adjacent one of the end walls, while the image forming member has the image forming surface thereof arranged adjacent the other end wall.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, which is a longitudinal sectional view of an apparatus incorporating the principles of the present invention.

Referring to the drawings, arrow 10 represents the object whose image is to be produced. The apparatus incorporating the principles of the present invention is arranged within a fluid-tight envelope 11 having opposite end walls 12 and 13.

Mounted adjacent the end wall 12 of the envelope 11 is a photo-responsive surface 2. If desired, the photo-responsive surface 2 may be coated on the end wall 12.

Spaced from the end wall 12 are focusing cylinders 3. The mechanical supports for mounting the cylinders 3 within the envelope are not shown in order to avoid unnecessarily complicating the drawing. However, it is apparent that these cylinders may be supported in predefined positions by conventional means.

Arranged at the other end of the cylinders 3 is a coarse grid 5 formed from a plurality of intersecting wires. Coated on the side of the coarse grid 5 which is farthest from the cylinders 3 is a photo-responsive layer 6. This photo-responsive layer can be responsive to light rays within a preselected frequency range such as blue or ultraviolet.

Arranged external to the envelope 11 are light sources 9 which generate light rays occurring within the preselected frequency range, the light rays being caused to impinge on the photo-responsive layer 6 through the side wall of the envelope 11.

Spaced from the photo-responsive layer 6 is a fine grid 4 which is also preferably made up of a plurality of wires intersecting substantially at right angles to each other. The openings between the spaced wires of the grid 4 are preferably one-half the size of the opening in the coarse grid 5.

The fine grid is made of a material having very good electrical conductivity and which has arranged thereon, in insulated fashion, a secondary electron emission layer.

Spaced from the fine grid 4 within the envelope 11 is an accelerating lens member 7. Finally, arranged adjacent the end wall 13 of the envelope 11 is an image forming member 8 having an image forming surface thereon responsive to charged particles such as electrons.

As already mentioned, none of the means for mechanically mounting the member within the tube envelope are illustrated in order to avoid unnecessarily complicating the drawing. The electrical operating potentials for the various members mounted within the tube envelope are supplied from a power supply 20 which is shown in block diagrammatic fashion in the drawing.

In operation, a lens 1 spaced from the end wall 12 is arranged with respect to the object 10 so as to form the image 14 of the object on the photo-responsive layer 2. Actually, the image is shown spaced from the layer 2 but this distance is exaggerated in order to illustrate the image.

The impingement of the light rays coming from the object 10 on the layer 2 causes charged particles such as electrons to be emitted from the layer 2 with an intensity proportional to the intensity of the light rays impinging on the respective portions of the layer 2.

The electrons emitted from the layer 2 are focused by the lenses 3 to form an image 14' on the fine grid 4 corresponding to the image formed on the layer 2. It can be seen in the drawing that the image 14' has the same polarity as the object 10.

The focusing of the image 14' on the fine grid 4 produces a potential distribution along the grid 4. This potential distribution is due to the secondary electrons emitted from those points on which the electrons coming from the layer 2 impinge. That is, when the impingement of an electron on one point of the fine grid 4 causes one or more secondary electrons to be emitted from such point, this point achieves a higher positive potential.

Accordingly, the greater the intensity of the light rays impinging on the layer 2, the higher will be the potential of the points on the grid 4 corresponding thereto.

The coarse grid 5 operates as a second source of charged particles or electrons when the light rays coming from the light sources 9 impinge on the photo-responsive layer 6 thereof. These electrons are normally accelerated by the cylindrical lens 7 and impinge on the image forming member 8.

When a point on the grid 4 has a negative potential with respect to the coarse grid 5, it will prevent electrons emitted from the grid 5 from reaching the image forming member 8. When a point on the fine grid 4 has a positive potential with respect to the coarse grid 5, it will accelerate electrons applied thereto from the grid 5.

Therefore, the grid 4 acts as a control grid to either accelerate or block the electrons attempting to pass from the grid 5 to the image forming member 8. It is clear that when an image produces a potential distribution pattern on the fine grid 4, this pattern operates to produce a corresponding pattern on the image forming member 8. Furthermore, the spacing between the grids 5 and 4 and the accelerating lens member 7 with respect to the image forming member 8 is such that a focused image of the grid 4 is produced on the image forming member 8 while an unfocused image of the coarse grid 5 is produced on the image forming member 8. This means that the potential distribution pattern formed in the grid 4 will be sharply reproduced on the image forming member 8.

In the above described manner, it can be seen that the grid 4 can be used as a control grid in an amplifier tube, with the grid 5 acting as the electron emitting cathode while the accelerating lens anode 7 acts as the anode. Accordingly, even if the object 10 is a low intensity image having a low illumination, the image formed in the image forming member 8 has a much higher intensity. Furthermore, if the object 10 is illuminated by very short light pulses, the image formed in the fine grid 4 will be stored there so that the image formed in the image forming member 8 will be a high itensity image having a high illumination.

It is apparent that if the object 10 is illuminated only by infrared rays, it is possible to produce a visible image by having the coating 2 responsive to infrared rays.

The apparatus is operated by initially providing a slight negative potential of the grid 4 with respect to the grid 5. If desired, a long persistence screen can be used for the image forming member 8.

In order to display additional images, it is necessary to erase the potential distribution formed along the grid 4. This can be done in many conventional ways. For example, it is possible to apply a very large positive potential to the grid 4 with respect to the grid 5 for a short time period. In this manner, all of the electrons emitted from the grid 5 will pass through to the image forming member 8, and the potential distribution will be erased.

Instead of using a phosphor for the image forming member 8, it is possible to use a signal plate similar to the type used in television camera tubes. This signal plate would be operated by an electron beam. Even though the electron beam would change the potential distribution of the signal plate, the potential distribution would continually be restored by the operation of the apparatus so that a picture having a long transmission time interval could be developed.

It will be understood that each of the elements described above, or two or more together, may also find a useful application in other types of image producing devices differing from the types described above.

While the invention has been illustrated and described as embodied in light amplifier and image converter apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adptations should and are intended to be comprehended within the meaning and range of equivalence of the following claims.

What is claimed as new and desired to be secured by Letters Patent is:

1. In an apparatus for producing a bright image of an object in combination, a first member spaced from the object having a surface responsive to light rays emitted from the object and for producing charged particles with an intensity related to the intensity of the light rays impinging on said surface; an image forming member spaced from said first member and having an image forming surface responsive to any charged particles impinging thereon; a coarse grid spaced from said image forming surface and having a photo-responsive surface thereon for emitting charged particles when light rays in a preselected energy range impinge thereon; a light source for generating light rays in said preselected energy range and for causing the same to impinge on said photo-responsive surface to produce charged particles; accelerating means arranged between said photo-responsive surface and said image forming surface for producing a flow of charged particles along a path between said photo-responsive surface and said image forming surface; a fine grid member arranged in said path between said photo-responsive surface and said accelerating means for controlling the flow of charged particles between said photo-responsive surface and said image forming surface in accordance with the potential distribution along said grid member; and means for focusing on said fine grid member the charged particles emitted from said light responsive surface of said first member to produce thereby a potential distribution pattern along said fine grid member corresponding to any pattern formed by the light rays impinging on said light responsive surface, whereby the potential distribution pattern formed along said grid member produces a corresponding pattern on said image forming surface.

2. Apparatus as claimed in claim 1 wherein said coarse and fine grids are each formed with a plurality of openings, the size of said openings of said coarse grid being at least twice as large as the respective size of said openings of said fine grid member.

3. In an apparatus for producing a bright image of an object, in combination, a first member spaced from the object having a surface responsive to light rays emitted from the object and for producing charged particles with an intensity related to the intensity of the light rays impinging on said surface; an image forming member spaced from said first member and having an image forming surface responsive to any charged particles impinging thereon; a coarse grid spaced from said image forming surface and having a photo-responsive surface thereon for emitting electrons when light rays in a preselected energy range impinge thereon; a light source for generating light rays in said preselected energy range and for causing the same to impinge on said photo-responsive surface to produce charged particles; accelerating lens means arranged between said photo-responsive surface and said image forming surface for producing a flow of charged particles along a path between said photo-responsive surface and said image forming surface; a fine grid member arranged in said path between said photo-responsive surface and said accelerating means for controlling the flow of charged particles between said photo-responsive surface and said image forming surface in accordance with the potential distribution along said fine grid member, the spacing between said fine and coarse grids, said accelerating lens means and said image forming surface being arranged so that a focused image of said fine grid and an unfocused image of said coarse grid are respectively formed on said image forming surface by said accelerating lens means; and means for focusing on said fine grid member the charged particles emitted from said light responsive surface of said first member to produce thereby a potential distribution pattern along said fine grid member corresponding to any pattern formed by the light rays impinging on said light responsive surface, whereby the potential distribution pattern formed along said grid member produces a corresponding pattern on said image forming surface.

4. In an apparatus for producing a bright image of an object, in combination, a first member spaced from the object having a surface responsive to light rays emitted from the object and for producing charged particles with an intensity related to the intensity of the light rays impinging on said surface; an image forming member spaced from said first member and having an image forming surface responsive to any charged particles impinging thereon; a coarse grid spaced from said image forming surface and having a photoresponsive surface thereon for emitting charged particles when light rays in a preselected energy range impinge thereon; a light source for generating light rays in said preselected energy range and for causing the same to impinge on said photo-responsive surface to produce charged particles; accelerating means arranged between said photo-responsive surface and said image forming surface for producing a flow of electrons along a path between said photo-responsive surface and said image forming surface; a fine grid member arranged in said path between said photo-responsive surface and said accelerating means for controlling the flow of charged particles between said photo-responsive surface and said image forming surface in accordance with the potential distribution along said grid member, said fine grid member being formed from an electrically conductive material and a secondary electron emitting surface coated thereon in insulated fashion; and means for focusing on said fine grid member the charged particles emitted from said light responsive surface of said first member to produce thereby a potential distribution pattern along said fine grid member corresponding to any pattern formed by the light rays impinging on said light responsive surface, whereby the potential distribution pattern formed along said grid member produces a corresponding pattern on said image forming surface.

5. In an apparatus for producing a bright image of an object, in combination, a first member spaced from the object having a surface responsive to light rays emitted from the object and for producing charged particles with an intensity related to the intensity of the light rays impinging on said surface; an image forming member spaced from said first member and having an image forming surface responsive to any charged particles impinging thereon; a coarse grid member spaced from said image forming surface and having a photo-responsive surface thereon for emitting charged particles when light rays in a preselected energy range impinge thereon; a light source member for generating light rays in said preselected energy range and for causing the same to impinge on said photo-responsive surface to produce charged particles; an accelerating member arranged between said photo-responsive surface and said image forming surface for producing a flow of charged particles along a path between said photo-responsive surface and said image forming surface; a fine grid member arranged in said path between said photo-responsive surface and said accelerating member for controlling the flow of charged particles between said photo-responsive surface and said image forming surface in accordance with the potential distribution along said fine grid member; a focusing member for focusing on said fine grid member the charged particles emitted from said light responsive surface of said first member to produce thereby a potential distribution pattern along said fine grid member corresponding to any pattern formed by the light rays impinging on said light responsive surface, whereby the potential distribution pattern formed along said grid member produces a corresponding pattern on said image forming surface, and said means for supplying operating potentials to said members whenever desired.

6. In an apparatus for producing an image of an object, in combination, a first member spaced from the object having a surface responsive to light rays emitted from the object and for producing charged particles related to the intensity of the light rays impinging on said surface; an image forming member spaced from said first member and having an image forming surface responsive to any charged particles impinging thereon; a second source of charged particles spaced from said image forming surface; accelerating means arranged between said second source of charged particles and said image forming surface for producing a flow of charged particles along a path between said second source and said image forming surface; a grid member arranged in said path between said second source of charged particles and said accelerating means for controlling the flow of charged particles between said second source and said image forming surface in accordance with the potential distribution along said grid member; means for focusing on said grid member the charged particles emitted from said light responsive surface of said first member to produce thereby a potential distribution pattern along said grid member correspondnig to any pattern formed by the light rays impinging on said light responsive surface, whereby the potential distribution pattern formed along said grid member produces a corresponding pattern on said image forming surface; and means for initially maintaining said grid member at a negative potential with respect to said second source of charged particles.

7. In an apparatus for producing a bright image of an object, in combination, a first member spaced from the object having a surface responsive to light rays emitted from the object and for producing charged particles with an intensity related to the intensity of the light rays impinging on said surface; an image forming member spaced from said first member and having an image forming surface responsive to any charged particles impinging thereon; a coarse grid spaced from said image forming surface and having a photo-responsive surface thereon for emitting charged particles when light rays in a preselected energy range impinge thereon; a light source for generating light rays in said preselected energy range and for causing the same to impinge on said photo-responsive surface to produce charged particles; accelerating means arranged between said photo-responsive surface and said image forming surface for producing a flow of charged particles along a path between said photo-responsive surface and said image forming surface; a fine grid member arranged in said path between said photo-responsive surface and said accelerating means for controlling the flow of charged particles between said photo-responsive surface and said image forming surface in accordance with the potential distribution along said fine grid member; means for focusing on said fine grid member the charged particles emitted from said light responsive surface of said first member to produce thereby a potential distribution pattern along said fine grid member corresponding to any pattern formed by the light rays impinging on said light responsive surface, whereby the potential distribution pattern formed along said grid member produces a corresponding pattern on said image forming surface.

8. In an apparatus for producing a bright image of an object, in combination, a first member spaced from the object having a surface responsive to light rays emitted from the object and for producing charged particles with an intensity related to the intensity of the light rays impinging on said surface; an image forming member spaced from said first member having an image forming surface responsive to any charged particles impinging thereon; a coarse grid spaced from said image forming surface and having a ray-responsive surface thereon for emitting charged particles when rays in a preselected energy range impinge thereon; a source of rays in said preselected energy range for causing said rays to impinge on said ray-responsive surface to produce charged particles; accelerating means arranged between said ray-responsive surface and said image forming surface for producing a flow of charged particles along a path between said ray-responsive surface and said image forming surface; a fine grid member arranged in said path between said coarse grid and said accelerating means for controlling the flow of charged particles between said coarse grid and said image forming surface in accordance with the potential distribution along said fine grid member; and means for focusing on said fine grid member the charged particles emitted from said light responsive surface of said first member to produce thereby a potential distribution pattern along said fine grid member corresponding to any pattern formed by the light rays impinging on said light responsive surface whereby the potential distribution pattern formed along said fine grid member produces a corresponding pattern on said image forming surface.

References Cited in the file of this patent
UNITED STATES PATENTS 2,802,963   Sheldon _____ Aug. 13, 1957